(12) United States Patent
Juhlin-Dannfelt

(10) Patent No.: US 8,762,017 B2
(45) Date of Patent: Jun. 24, 2014

(54) METHOD AND SYSTEM FOR OPENING OF A CLUTCH

(75) Inventor: Peter Juhlin-Dannfelt, Hägersten (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/391,723

(22) PCT Filed: Sep. 13, 2010

(86) PCT No.: PCT/SE2010/050968
§ 371 (c)(1),
(2), (4) Date: Feb. 22, 2012

(87) PCT Pub. No.: WO2011/031226
PCT Pub. Date: Mar. 17, 2011

(65) Prior Publication Data
US 2012/0158265 A1    Jun. 21, 2012

(30) Foreign Application Priority Data
Sep. 14, 2009    (SE) .................................... 0901183

(51) Int. Cl.
*G06F 7/00*    (2006.01)
(52) U.S. Cl.
USPC .......................................................... 701/68
(58) Field of Classification Search
None
See application file for complete search history.

(56) References Cited

U.S. PATENT DOCUMENTS

| | | |
|---|---|---|
| 5,738,609 A | 4/1998 | Jones et al. |
| 6,847,878 B2 * | 1/2005 | Cimmino et al. ............... 701/56 |
| 2002/0062187 A1 * | 5/2002 | Cimmino et al. ............... 701/56 |
| 2002/0087252 A1 * | 7/2002 | Shimizu et al. ................. 701/84 |
| 2012/0150402 A1 * | 6/2012 | Juhlin-Dannfelt et al. ..... 701/67 |

FOREIGN PATENT DOCUMENTS

| | | |
|---|---|---|
| CN | 1067717 A | 1/1993 |
| CN | 1137251 A | 12/1996 |
| DE | 10160420 A1 | 6/2003 |
| EP | 1 020 665 | 7/2000 |
| JP | 62-99227 | 5/1987 |
| WO | WO 02/081950 | 10/2002 |
| WO | WO 03/066367 | 8/2003 |

OTHER PUBLICATIONS

International Search Report dated Nov. 24, 2010 issued in corresponding international application No. PCT/SE2010/050968.
Chinese Office Action dated Jul. 3, 2013 in corresponding Chinese Patent Application No. 201080040560.X (English language translation).

* cited by examiner

*Primary Examiner* — Thomas Tarcza
*Assistant Examiner* — Adam Alharbi
(74) *Attorney, Agent, or Firm* — Ostrolenk Faber LLP

(57) ABSTRACT

A method for opening of an automatically controlled clutch (106) of a vehicle which comprises a combustion engine (101) for generating driving force intended for transmission to at least one powered wheel (113, 114) via the clutch and a gearbox (103). The method includes opening the clutch at an initial rate to at least a first position substantially corresponding to a position at which the clutch can at most transmit the maximum torque which the combustion engine can deliver at idling speed, and from the first position, opening the clutch at a second rate which is lower than the initial rate.

15 Claims, 4 Drawing Sheets

METHOD AND SYSTEM FOR OPENING OF A CLUTCH

CROSS-REFERENCE TO RELATED APPLICATIONS

The present application is a 35 U.S.C. §§371 national phase conversion of PCT/SE2010/050968, filed Sep. 13, 2010, which claims priority of Swedish Application No. 0901183-4, filed Sep. 14, 2009, the contents of which are incorporated by reference herein. The PCT International Application was published in the English language.

FIELD OF THE INVENTION

The present invention relates to a vehicle with an automatically controlled clutch and in particular to a method for opening the clutch. The invention relates also to a system and a vehicle including the clutch.

BACKGROUND TO THE INVENTION

For vehicles in general, many different power train configurations are available. For example, the gearbox may take the form of a manually operated gearbox or an automatically operated gearbox. It is often desirable that heavy vehicles should be drivable as comfortably for the driver as possible. This means, for example, that the gear changes should be executed automatically by the control system usually incorporated in the vehicle. Automatically operated gearboxes have therefore become increasingly common in heavy vehicles.

However, this automatic gear changing is usually not executed by an automatic gearbox in the traditional sense, but by a "manual" gearbox controlled by the control system, partly because manual gearboxes are substantially less expensive to manufacture, but also because they are more efficient. With regard to automatic gearboxes of the type commonly used in passenger cars, the level of efficiency is often too low, compared with a manually operated gearbox, to justify their use other than in, for example, city buses and local delivery vehicles in urban areas where frequent starting and stopping is usual.

Heavy vehicles largely used on major roads/motorways therefore usually have automatically operated "manual" gearboxes.

This gear changing may be effected in several different ways. In one type the driver uses a clutch pedal to set the vehicle in motion from stationary, but all other gear changing can be effected by the vehicle's control system without involving the clutch at all. Instead, the gear changes are carried out "torque-free", i.e. the torque delivered from the engine is adjusted to a suitable level to reduce the torque transmitted at the engagement points of the relevant gears.

Another method is to use instead an automatically controlled clutch with automatic upshifts/downshifts, in which case the driver has access to only an accelerator pedal and a brake pedal.

On this type of vehicle with an automatic clutch, just as in the case of a manually controlled clutch, the clutch must open when the driver presses the brake pedal and the vehicle's running speed has been slowed to a level at which the engine speed approaches the idling speed. Hard braking involves certain requirements for this clutch opening. If the clutch opens too quickly, there is risk of causing undesirable vibrations in the power train, whereas if the clutch opens too slowly, there is risk of the engine speed dropping to such a low level as to risk the engine stalling.

There is therefore a need for an improved method for opening of the clutch of vehicles with an automatically controlled clutch.

SUMMARY OF THE INVENTION

An object of the present invention is to propose a method for opening a clutch which solves the above problem.

The present invention relates to a method for opening of an automatically controlled clutch of a vehicle which comprises a combustion engine for generating driving force intended for transmission to at least one powered wheel via said clutch and a gearbox. The method comprises the steps of:

opening said clutch at an initial rate to at least a position substantially corresponding to a position at which the clutch can at most transmit the maximum torque which said combustion engine can deliver at idling speed, and from the first position, opening said clutch at a second rate which is lower than said initial rate.

The advantage of this is that the clutch can, without causing undesirable power train vibrations, be opened quickly to a position at which there is no risk of the engine stalling, which means that it can in principle be opened at any desired slow rate. In one embodiment, the clutch is opened to the position at which it can at most transmit the maximum torque which said combustion engine can deliver at idling speed, which has the advantage that the clutch can always be opened to that position without risk of the engine stalling. Alternatively, the clutch may be opened a little further at said initial rate, in which case it will be opened to a position at which it is opened at said initial rate from a position which substantially corresponds to a position at which it can at most transmit the torque which it transmits when its opening begins, which means that it can also be opened further at said initial rate to a position at which still less torque can be transmitted without causing undesirable power train vibrations.

Said second rate (it will be appreciated that said initial and second rates need not be constant and may include variations, so rate in this context is to be taken to mean an average rate if variations occur) may, for example, represent a maximum of three-quarters of said initial rate.

Further characteristics of the present invention and advantages thereof are indicated by the detailed description of examples of embodiments set out below and the attached drawings.

DETAILED DESCRIPTION OF EXAMPLES OF EMBODIMENTS

Figure 1:
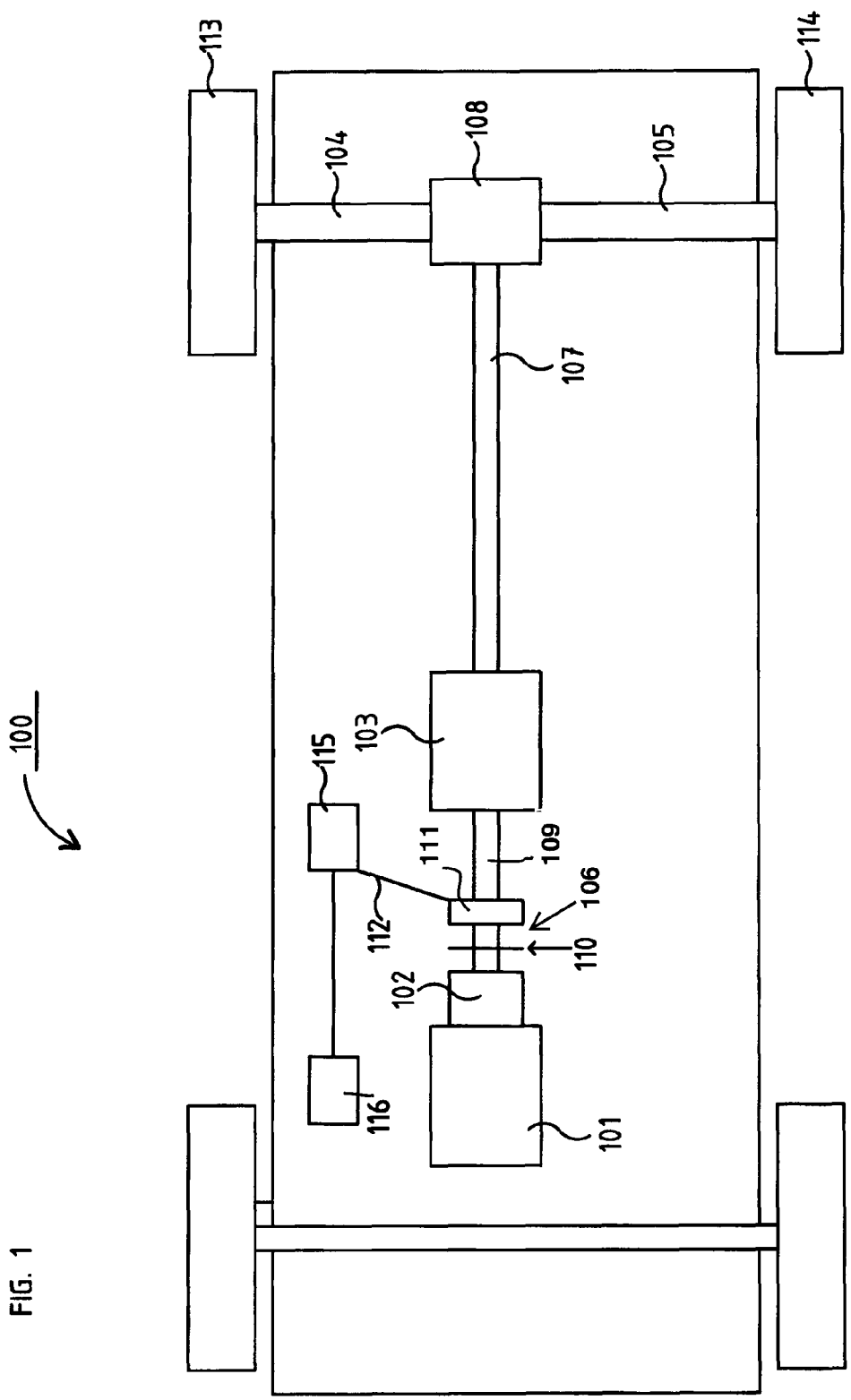
FIG. 1 depicts a power train in a vehicle with which the present invention may with advantage be used.

FIG. 1 illustrates an example of a power train in a vehicle 100 according to an embodiment example of the present invention. The vehicle illustrated schematically in FIG. 1 comprises only one axle with powered wheels 113, 114 but the invention is also applicable in vehicles where more than one axle is equipped with powered wheels. The power train comprises a combustion engine 101 which is connected in a conventional way via an output shaft of the combustion engine 101, usually via a flywheel 102, to a gearbox 103 via a clutch 106.

The clutch 106 takes the form of an automatically controlled clutch of disc type whereby a friction element (disc) 110 connected to a first gearbox component, e.g. the input shaft 109 of the gearbox 103, engages selectively with the engine's flywheel 102 to transmit driving force from the combustion engine 101 to the powered wheels 113, 114 via the gearbox 103. The engagement of the clutch disc 110 with the engine's output shaft is controlled by means of a pressure plate 111, which is movable sideways, e.g. by means of a lever 112, the function of which is controlled by a clutch actuator 115. The influence of the clutch actuator 115 upon the lever 112 is controlled by the vehicle's control system.

Vehicle control systems in modern vehicles usually consist of a communication bus system consisting of one or more communication buses for connecting together a number of electronic control units (ECUs), or controllers, and various components located on the vehicle. A control system of this kind may comprise a large number of control units, and the responsibility for a specific function may be divided amongst two or more control units. For the sake of simplicity, FIG. 1 illustrates only one such control unit 116 which controls the clutch (the clutch actuator 115). In reality, the control of the clutch actuator 115 by the control unit 116 will for example probably depend on information which is for example received from the control unit which is responsible for the function of the gearbox 103, and from the control unit/units that control engine functions.

The vehicle further comprises drive shafts 104, 105 which are connected to the vehicle's powered wheels 113, 114 and are driven by an output shaft 107 from the gearbox 103 via an axle gear 108, e.g. a conventional differential.

As mentioned above, in vehicles with a control system which controls an automatic clutch, the vehicle's control system must open the clutch when the driver presses the brake pedal and the engine speed's has dropped to, or is approaching, its idling speed, to enable the vehicle to stop without the engine stalling. In some cases, the control system may control this opening of the clutch more freely, but in other cases, the clutch must be opened quickly, e.g. when hard braking occurs.

As above, however, there is risk of causing undesirable vibrations in the power train if the torque is removed from it too quickly when the clutch is opened, i.e. if the clutch is opened too quickly. In contrast, if the opening of the clutch takes too long a time, there is risk that the braking torque which acts against the engine's idling regulator may become so high that the engine is eventually unable to avoid stopping.

Rapid opening of the clutch is therefore required, but in such a way as to avoid at the same time removing the torque from the power train in such a rapid and uncontrolled way that undesirable vibrations occur.

If the engine causes braking torque in the power train, fuel may be injected into the engine to achieve a power train relieved of torque, after which the clutch can be opened as quickly as possible without risk of undesirable power train vibrations. This extra fuel injection does mean, however, that this method causes an increase in undesirable engine hum which the driver may find annoying when he/she presses the brake.

If, for example, the idling regulator causes driving torque in the power train at the same time as the vehicle is braked, it is not possible to use the engine to relieve the power train of torque without the engine stopping completely.

The present invention provides a way in which the clutch can be opened not only quickly to prevent the engine stalling but also in a controlled way which does not cause undesirable power train vibrations.

Figure 2:
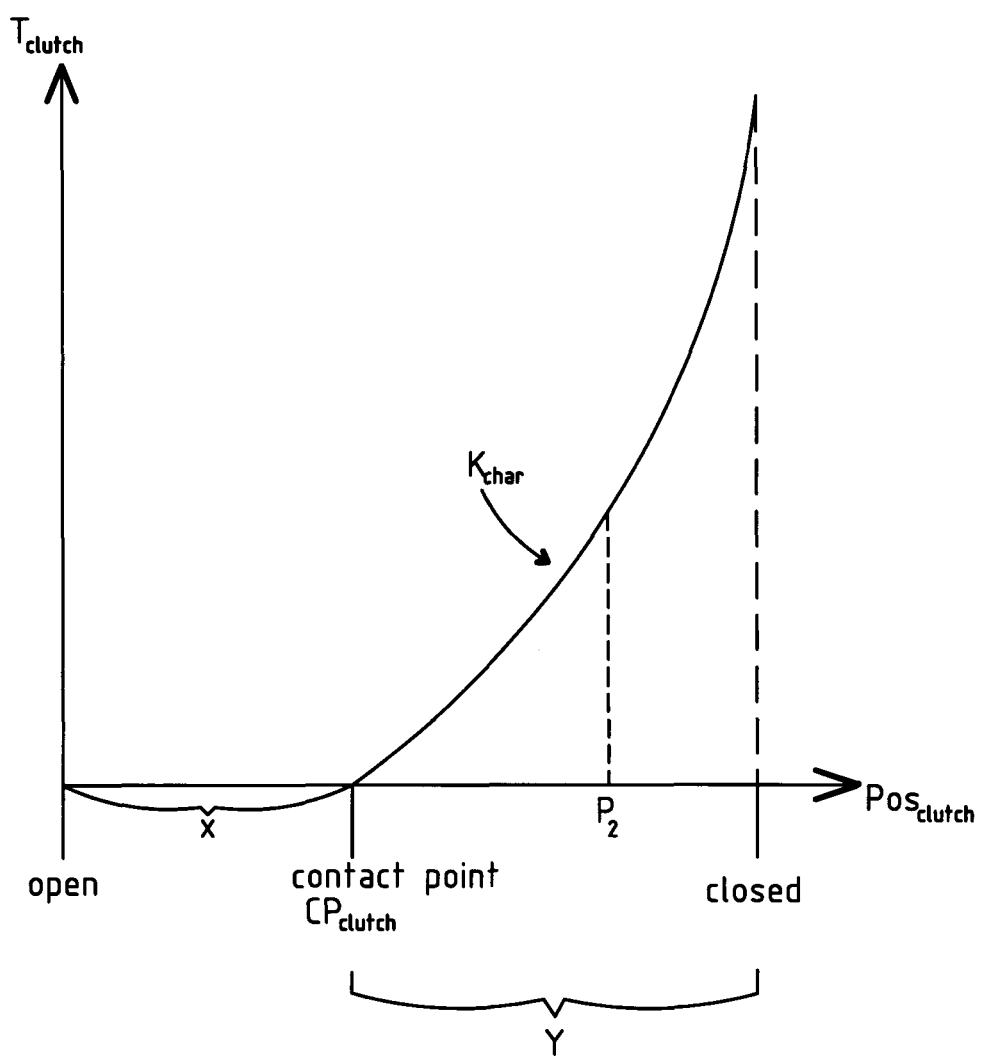
FIG. 2 illustrates a clutch function according to the state of the art.

FIG. 2 illustrates an example of a characteristic for a clutch of the type depicted in FIG. 1. The y axis represents the torque which the clutch can transmit between the engine and the power train, the x axis represents the position of the clutch (or of the clutch actuator), and the origin represents the clutch open, i.e. with the clutch disc (and consequently the lever/the clutch actuator) in its one extreme position, while "closed" represents the position in FIG. 1 at which the clutch disc is as far to the left as possible and the clutch (the lever/the clutch actuator) is therefore in its other extreme position.

The clutch disc will normally be in an open position, at a distance from the engine's flywheel, so closing the clutch will move the clutch disc a distance x before it actually comes into physical contact with the engine's flywheel. As soon as the clutch disc is in contact with the flywheel, torque transmission between the engine and the rest of the power train can begin. Thereafter, the further the clutch is closed (the harder the clutch disc engages frictionally with the flywheel), the more torque can be transmitted between the engine and the rest of the power train. Exactly how much torque can be transmitted at each point depends on the clutch characteristic $K_{char}$, which can vary from clutch to clutch.

Conversely this means that, throughout the movement from contact point to full closure, the clutch can transmit a greater or smaller amount of torque (the more closed the clutch is, the more torque can be transmitted), i.e. torque can be transmitted during the movement period y in FIG. 2.

Figure 3:
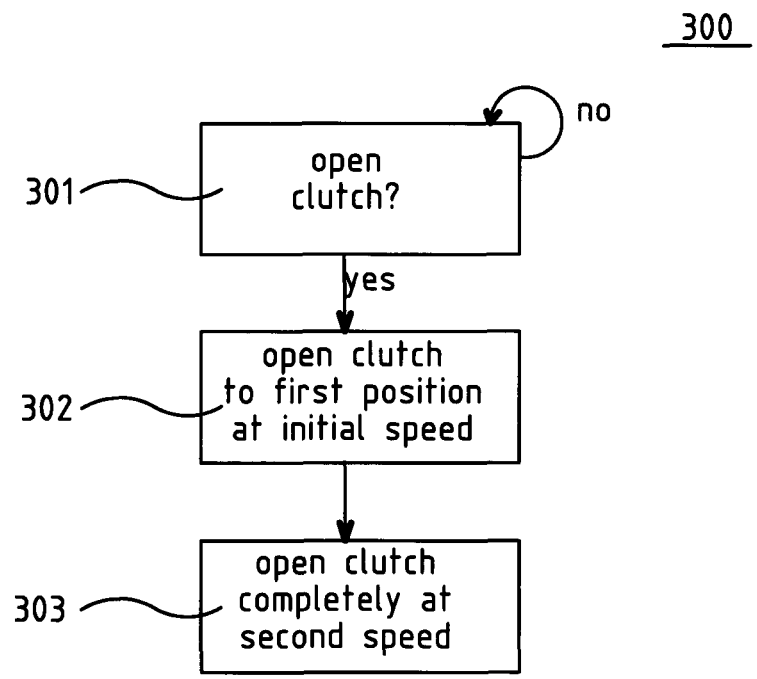
FIG. 3 illustrates an example of a method according to the present invention.
Figure 4:
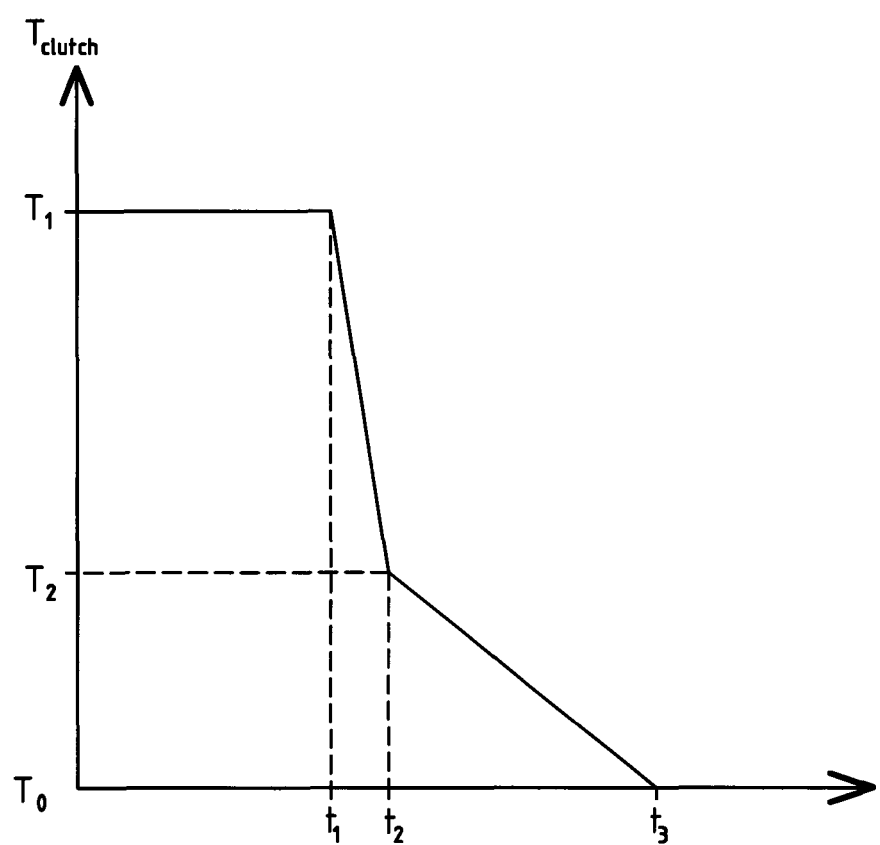
FIG. 4 illustrates an example of opening of a clutch according to the present invention.

The present invention utilises this fact. A method example 300 according to the present invention is illustrated in FIG. 3. The method begins with step 301, which determines whether the clutch should be opened, e.g. because the vehicle is being braked and there is risk of the engine speed dropping below idling speed. If the clutch is to be opened, the process moves on to step 302, whereby the clutch is opened to a first position at an initial rate. This is illustrated in FIG. 4, where the x axis represents time and the y axis the torque which the clutch can transmit, i.e. point $T_1$ corresponds to the "closed" position in FIG. 2 and position $T_0$ corresponds to the clutch contact point in FIG. 2. When the torque which the clutch can transmit moves from point $T_1$ to point $T_0$, the clutch position is changed from "closed" to position $CP_{clutch}$ in FIG. 2.

Thus, when opening of the clutch begins at step 302, i.e. at time $t_1$ in FIG. 4, the clutch is opened at an initial rate, preferably as quickly as possible, from point (position) $T_1$ to point (position) $T_2$, which corresponds to position $P_2$ in FIG. 2. Position $T_2$ represents the torque which the clutch transmits between the engine and the rest of the power train at substantially the time ($t_1$) when the opening of the clutch begins. It may be of advantage for position $T_2$ to be provided with a certain margin to compensate for situations where the clutch characteristic $K_{char}$ adopted is not quite correct, i.e. for $T_2$ to be set to $T_2+\Delta T$, where $\Delta T$ represents a compensation factor. The clutch characteristic may, for example, be estimated by workshop/factory measurements or during operation. Such clutch characteristic estimation during operation is prior art and is therefore not described further here. The same also applies to the clutch contact point, which usually varies with clutch temperature, there being known methods for estimating this contact point.

The compensation factor may also be adapted to compensate for any errors in determining the torque transmitted by the clutch. The torque in the power train can often be calculated in today's vehicles. Engine torque delivered may for example be calculated on the basis of knowing amounts of fuel injected into the cylinders, ignition angles, turbo charging pressures, etc. The torque delivered by the engine in relation to injection times, injection volumes, turbo pressures, etc. can, for example, be measured in advance and stored in a memory in the vehicle communication system for use in various vehicle control systems, e.g. the engine control unit, the gearbox control unit and the control unit 116 as above. The torque delivered by the engine can be determined in this way and position $T_2$ can also be determined on the basis of these data and the clutch characteristic.

Today's vehicles often also employ techniques, not further described here, for determining the braking torque exerted upon the power train by the vehicle's brake system. In general, however, the driving torque from the engine can be determined with greater accuracy than the braking torque, so $\Delta T$ in an embodiment can be set to a higher value when $T_2$ is determined by the braking torque.

Rapid opening of the clutch to position $T_2$ will not cause undesirable jerking, as the clutch is still able to transmit the torque which is then in the power train. When thereafter the clutch is opened to point $T_2$ ($P_2$) at time $t_2$, the rate at which it is opened is reduced to a second rate, step 303. At this stage, the clutch can in principle be opened at any desired rate, since the opening to point $T_2$ will have already provided assurance that the engine cannot be loaded with more than this torque, so here again there is no risk of the engine stalling. The average for said second rate may for example be at most half of the average for said initial rate.

Opening the clutch fully thereafter at said lower second rate makes it possible for the clutch to be opened sufficiently slowly to ensure that no undesirable power train vibrations occur.

The clutch opening from time $t=t_2$ to time $t=t_3$ (i.e. when the clutch reaches the contact point and is thereafter fully open), may be linear, exponential or in accordance with some other appropriate function.

The present invention therefore has the advantage that the clutch can, quickly and without undesirable power train vibrations, be opened to a position at which there is no risk of the engine stalling, which means that it can in principle be opened at any desired slow rate. Any increase in the braking torque exerted by the vehicle's brake system between $t=t_2$ and $t=t_3$ in FIG. 4 will only increase the clutch slip and not the engine load. The present invention therefore means that the time taken to open the clutch from $T_2$ till $T_0$ can be determined from a comfort perspective without having to take into consideration the risk of the engine stalling.

Rather than having point $T_2$ take the form, as above, of the torque which is in the power train at the moment of clutch engagement, it may instead be the point which (substantially) corresponds to the maximum torque which the engine can deliver when idling. The fact that the engine can always deliver that torque means that any risk of its stalling will be ruled out by always opening the clutch quickly to that point.

The invention claimed is:

1. A method for opening of an automatically controlled clutch of a vehicle wherein the vehicle comprises a combustion engine for generating driving force intended for transmission to at least one powered wheel via the clutch and a gearbox, the method comprising the steps of:
opening the clutch at an initial rate of opening to at least a first clutch position substantially corresponding to a position at which the clutch can at most transmit a maximum torque which the combustion engine can deliver at idling speed; and
from the first position, opening the clutch at a second rate of opening which is lower than the initial rate.

2. The method according to claim 1, wherein the initial rate at least exceeds half of the maximum rate at which the clutch can be opened.

3. The method according to claim 1, wherein the initial rate is substantially the maximum rate at which the clutch can be opened.

4. The method according to claim 1, wherein the step of opening the clutch comprises:
opening the clutch at the initial rate to a position substantially corresponding to a position at which the clutch can at most transmit the torque which the clutch transmits when opening of the clutch begins when the torque which the clutch transmits drops below the maximum torque which the combustion engine can deliver at idling speed.

5. The method according to claim 1, wherein the first position is determined by means of a clutch characteristic.

6. The method according to claim 1, wherein the second rate is a maximum of three-quarters of the initial rate.

7. A computer program product comprising a non-transitory computer-readable medium and a computer program, the computer program containing executable program code, the computer program, when the executable program code is executed in a computer, causing the computer to carry out a method for opening of an automatically controlled clutch of a vehicle wherein the vehicle comprises a combustion engine for generating driving force intended for transmission to at least one powered wheel via the clutch and a gearbox, the method comprising the steps of:
opening the clutch at an initial rate of opening to at least a first clutch position substantially corresponding to a position at which the clutch can at most transmit a maximum torque which the combustion engine can deliver at idling speed; and
from the first position, opening the clutch at a second rate of opening which is lower than the initial rate;
wherein the computer program is contained in the non-transitory computer-readable medium.

8. A system for opening of an automatically controlled clutch of a vehicle, wherein the vehicle comprises a combustion engine for generating driving force for transmission to at least one powered wheel via the clutch and a gearbox and other devices configured and operable for:
opening the clutch at an initial rate to at least a first position substantially corresponding to a position at which the clutch can at most transmit the maximum torque which the combustion engine can deliver at idling speed; and
from the first position, opening the clutch at a second rate which is lower than the initial rate.

9. A vehicle comprising a system for opening of an automatically controlled clutch of a vehicle wherein the vehicle comprises a combustion engine for generating driving force for transmission to at least one powered wheel via the clutch and a gearbox and other devices configured and operable for:
opening the clutch at an initial rate to at least a first position substantially corresponding to a position at which the clutch can at most transmit the maximum torque which the combustion engine can deliver at idling speed; and
from the first position, opening the clutch at a second rate which is lower than the initial rate.

10. The method according to claim 1, wherein the opening of the automatically controlled clutch of the vehicle occurs in a situation of hard braking.

11. The computer program product according to claim 7, wherein the opening of the automatically controlled clutch of the vehicle occurs in a situation of hard braking.

12. The system according to claim 8, wherein the opening of the automatically controlled clutch of the vehicle occurs in a situation of hard braking.

13. The vehicle according to claim 9, wherein the opening of the automatically controlled clutch of the vehicle occurs in a situation of hard braking.

14. The system according to claim 8, wherein the vehicle further comprises the clutch and a clutch actuator.

15. The vehicle according to claim 9, wherein the vehicle further comprises the clutch and a clutch actuator.

* * * * *